3,149,036
ADJUVANT VACCINE WITH ALUMINUM MONO-
STEARATE, MANNIDE MONOOLEATE, VEGE-
TABLE OIL, AND AN AQUEOUS PHASE IM-
MUNOLOGICAL AGENT
Allen F. Woodhour, Horsham, and Thomas B. Stim,
Sumneytown, Pa., assignors to Merck & Co., Inc., Rah-
way, N.J., a corporation of New Jersey
No Drawing. Filed Oct. 16, 1961, Ser. No. 145,432
12 Claims. (Cl. 167—78)

This invention is concerned with a novel adjuvant composition which when employed as a vehicle for the administration of injectable immunological substances produces higher antibody titers than are obtainable by the use of an equivalent aqueous dose thereof. In addition to potentiating the antibody titer, the adjuvant compositions of this invention also maintain these high titers over a much longer period of time than is achieved by an equivalent aqueous dose of the immunological substance.

The invention also is concerned with the use of the novel adjuvant composition in the preparation of vaccines for use in the immunization of man or animal and for use in animals to produce antisera for diagnostic and therapeutic purposes.

The need for an adjuvant in the administration of immunological substances has long been recognized and considerable work has been done to discover substances which when added to an antigen or other immunological substance would potentiate its antigenic activity and thereby its antibody stimulating capacity. To date, many such adjuvants have been discovered such as the use of alum precipitation of antigens, combining certain specific antigens some of which would potentiate the activity of the others in the mixture, the use of calcium phosphate particularly to potentiate influenza antibody production, the similar use of Staphylococcus toxin which appeared to improve the antibody response to certain antigens. Several other adjuvant substances also have been considered such as tapioca, calcium, or magnesium salts, tannin, and the like which when added to certain specific antigens would increase the antibody titer over that obtainable when the antigen alone was administered. While most of these antigens gave satisfactory responses when administered along with one or at most a few antigens, none of these agents could be used successfully as an adjuvant with all immunological substances in order to potentiate the antibody response.

While the prior discoveries appeared to provide a satisfactory solution to the problem because of the relatively few antigens which were available for use to immunize man and animals, today an ever increasing number of antigens are being made available for immunization and prophylaxis and it becomes of increasingly more importance that the antigens be combined for administration in a single dosage form. To accomplish this it is necessary to use smaller quantities of the antigen in order to have them contained in a sufficiently small volume for administration in a single dosage form. The need therefore exists for an adjuvant which is relatively nontoxic to the host and which will potentiate the antibody response to all antigens and additionally will maintain the titer over a long period of time thus endowing the host with a long period of immunity.

In an attempt to satisfy the current needs, it had been proposed to use a mineral oil emulsion in which the antigen was incorporated in the aqueous phase. While this seemed to present some promise of providing an adjuvant-type composition, it was found that it was not in fact a suitable solution because the mineral oil was not metabolized by the animal host and therefore could be a carcinogen. These workers then tried to overcome the toxic properties of the mineral oil by replacing it with peanut oil. They found, however, that the vegetable oil did not potentiate the antigenic properties of the immunological agents and was not a useful substitute for the mineral oil (Annual Review Microbiology, 1947, page 297).

It has now been discovered as a feature of this invention that an adjuvant composition in the form of a stable emulsion comprising a vegetable oil, water (or aqueous phase), mannide monooleate and a substance, aluminum monostearate, can be used as a vehicle for all immunological substances and when combined with an antigen or multiple antigens will produce abnormally high antibody titers and an abnormally long duration of immunity and additionally will be non-toxic to the host. While the vegetable oil and aqueous phase of the adjuvant composition can be varied within the limits described herein below, it is essential that the other ingredients be present in the emulsion in order to obtain an adjuvant effect when an antigen or antigens are incorporated therein.

The adjuvant composition of this invention comprises from 20–75% by volume of a vegetable oil, 2.5–25% by volume of mannide monooleate, 0.5–5% by volume of aluminum monostearate, and sufficient quantity of water or aqueous solution to bring the volume to 100%.

The novel adjuvant compositions are prepared by intimately admixing the mannide monooleate in the vegetable oil. The bivalent mixture then is combined with the aluminum monostearate. The complete trivalent oil vehicle is heated slowly, with simultaneous mixing, to a temperature sufficient to disperse the aluminum monostearate and impart some degree of thixotropy. The solution then is cooled to room temperature before addition of the aqueous phase. The aqueous phase then is added portionwise to the mixture and is emulsified by homogenizing by any number of known mechanical means, for example by the use of a colloid mill, Waring or other blendor, homogenizers, vibrators, pulsators, or other variable speed mechanical stirring devices.

While the emulsion thus prepared forms a stable adjuvant composition which can safely be used as a vehicle for the administration of immunological agents to man and animals, other materials such as secondary emulsifiers, as "Tween 80," polysorbate 80 (Atlas Powder Co.) can be incorporated in the emulsion.

The emulsion prepared by this procedure is of a water in oil variety as determined by the drop test and does not conduct electricity. Its breaking point when placed in gradually heated water is greater than 80° C. and it can withstand 56° C. for at least one week, and 37° C. for at least two weeks without separation of the aqueous phase. The composition additionally is stable for at least 4 months at 37° C. and at 4° C. without evidence of breaking. The emulsion also does not break into oil and water phases after centrifugation at speeds up to 2500 r.p.m. for an hour and does not produce more than 20% excess oil phase after such centrifugation. The particle size of the internal phase, that is the water phase, is less than 100 microns and the viscosity of the whole emulsion is between 2000 to 8500 cps. when tested in a Brookfield viscometer utilizing spindle No. 2 at 5 r.p.m. These specifications, however, do not have to be found in all emulsions of this invention as variations therein can be made without destroying the useful character of the adjuvant vehicle.

When the adjuvant composition of this invention is employed as a vehicle for an immunological substance, the antigen (or antigens) is incorporated in the aqueous phase prior to the addition of the aqueous phase to the vegetable oil in the process described above. The immunological agent advantageously is used in purified or concentrated form although it can as well be added in any other desired aqueous medium such as in the form of a vaccine in which it is normally administered or dissolved in a balanced salt solution, physiological saline solution, phosphate buffered saline solution, tissue culture fluids as Eagle Basal Media [Science (1959), volume 130, page 432, Eagle, H]; Medium 199 [Proc. Soc. Exptl. Biol. and Med., vol. 73, page 1 (1950), Morgan, J. F., et al.] and the like, or other media in which the organism may have been grown as embryonated egg amniotic, allantoic, or yolk sac material and the like. The aqueous phase also may contain preservatives and/or substances conventionally incorporated in vaccine preparations.

The antigen itself may be in the form of purified or partially purified antigen derived from bacteria, viruses, rickettsia or their products, or extracts of bacteria, viruses, or rickettsia, or the antigen may be an allergen such as pollens, dusts, danders, or extracts of the same or the antigen may be in the form of a poison or a venom derived from poisonous insects or reptiles. In all cases the antigens will be in the form in which their toxic or virulent properties have been reduced or destroyed and which when introduced into a suitable host will either induce active immunity by the production therein of antibodies against the specific micro-organisms, extract or products of micro-organisms used in the preparation of the antigen or, in the case of allergens, they will aid in alleviating the symptoms of the allergy due to the specific allergen. The antigens can be used either singly or in combination, for example, multiple bacterial antigens can be employed, multiple viral antigens, multiple rickettsial antigens, multiple bacterial or viral toxoids, multiple allergens or combinations of any of the foregoing products can be combined in the aqueous phase of the adjuvant composition of this invention. Antigens of particular importance are derived from bacteria such as *H. pertussis*, *Leptospira pomona* and *icterohaemorrhagiae*, *S. typhosa*, *S. paratyphi* A and B, *C. diphtheriae*, *C. tetani*, *C. botulinum*, *C. perfringens*, *C. feseri* and other gas gangrene bacteria, *B. anthracis*, *P. pestis*, *P. multocida*, *V. cholerae* and the like; from viruses as poliovirus (multiple types), adeno virus (multiple types), parainfluenza virus (multiple types), measles, mumps, respiratory syncytial virus, influenza (various types), shipping fever virus (SF4), Western and Eastern equine encephalomyelitis, Japanese B. encephalomyelitis, Russian Spring Summer encephalomyelitis, hog cholera virus, Newcastle disease virus, fowl pox, rabies, feline and canine distemper and the like viruses, from rickettsiae as epidemic and endemic typhus or other members of the spotted fever group, from various spider and snake venoms or any of the known allergens for example from ragweed, house dust, pollen extracts, grass pollens and the like.

Any vegetable oil known to be suitable for use in injectable preparations and which satisfy the specifications of U.S. Pharmacopeia or National Formulary can be employed in the adjuvant compositions of this invention. Oils which have been used successfully in the preparation of those compositions are peanut oil, corn oil, olive oil, sesame oil, chaulmoogra oil, cotton-seed oil, oil of sweet almond, and persic oil. Other vegetable oils known to be useful in injectable preparations can, of course, be substituted for any of these vegetable oils.

When antigens are incorporated in the novel adjuvant composition of this invention prepared as described above, an antibody response which is adjuvant-like in nature will be elicited in the host upon administration.

The following examples describe various adjuvant compositions falling within the scope of this invention which are suitable for use in the preparation of vaccines in which any of the antigens mentioned above are incorporated either singly or in combination.

EXAMPLE 1

| | Percent by volume |
|---|---|
| Peanut oil | 30.0 |
| Mannide monooleate | 5.0 |
| Aluminum monostearate | 1.4 |
| Phosphate buffered saline | 63.6 |

The mannide monooleate is added to the peanut oil and thoroughly mixed with an overhead stirrer. Aluminum monostearate is added slowly with stirring to the peanut oil-mannide monooleate bivalent oil vehicle and the homogeneous mixture then is heated slowly with stirring to about 120° C. to insure thorough dispersion of the aluminum monostearate in the bivalent oil vehicle. The homogeneous mixture is permitted to cool to room temperature (20–30° C.) after which the aqueous phase is incorporated slowly in the mixture with stirring using a variable speed mechanical stirring device to form the emulsion. The emulsion thus formed has the following characteristics, viz.:

| | |
|---|---|
| Stable droplets in water at room temperature | Yes. |
| Breaking point of emulsion | >95° C. |
| Electrical conductivity | Neg. |
| Percent oil phase produced at: | |
| 200 r.p.m. for 45 minutes | No separation. |
| 2000 r.p.m. for 45 minutes | No separation. |
| Viscosity [1] | Excellent. |

[1] Viscosity data represents the rate of flow through a 27 gauge needle.

EXAMPLE 2

| | Percent by volume |
|---|---|
| Peanut oil | 35.0 |
| Mannide monooleate | 5.0 |
| Aluminum monostearate | 1.6 |
| Phosphate buffered saline | 58.4 |

The above ingredients were admixed and converted into an emulsion by the method described in Example 1. The emulsion thus formed had the following stability characteristics:

| | |
|---|---|
| Stable droplet in water at room temperature | Yes. |
| Breaking point of emulsion | >95° C. |
| Electrical conductivity | Neg. |
| Percent oil phase produced at: | |
| 200 r.p.m. for 45 minutes | No separation. |
| 2000 r.p.m. for 45 minutes | No separation. |
| Viscosity | Excellent. |

EXAMPLE 3

| | Percent by volume |
|---|---|
| Peanut oil | 65.0 |
| Mannide monooleate | 5.0 |
| Aluminum monostearate | 2.8 |
| Phosphate buffered saline | 27.2 |

The above ingredients were admixed and converted into an emulsion by the method described in Example 1.

The emulsion thus formed had the following stability characteristics:

| | |
|---|---|
| Stable droplets in water at room temperature | Yes. |
| Breaking point of emulsion | 92° C. |
| Electrical conductivity | Neg. |
| Per cent oil phase produced at: | |
| 200 r.p.m. for 45 minutes | No separation. |
| 2000 r.p.m. for 45 minutes | <1% separation. |
| Viscosity | Excellent. |

EXAMPLE 4

| | Percent by volume |
|---|---|
| Peanut oil | 45.5 |
| Mannide monooleate | 2.5 |
| Aluminum monostreate | 2.0 |
| Phosphate buffered saline | 50.0 |

The above ingredients were admixed and converted into an emulsion by the method described in Example 1. The emulsion thus formed had the following stability characteristics:

| | |
|---|---|
| Stable droplets in water at room temperature | Yes. |
| Breaking point of emulsion | >95° C. |
| Electrical conductivity | Neg. |
| Percent oil phase produced at: | |
| 200 r.p.m. for 45 minutes | No separation. |
| 2000 r.p.m. for 45 minutes | No separation. |
| Viscosity | Excellent. |

EXAMPLE 5

| | Percent by volume |
|---|---|
| Peanut oil | 23.0 |
| Mannide monooleate | 25.0 |
| Aluminum monostearate | 2.0 |
| Phosphate buffered saline | 50.0 |

The above ingredients were admixed and converted into an emulsion by the method described in Example 1. The emulsion thus formed had the following stability characteristics:

| | |
|---|---|
| Stable droplets in water at room temperature | Yes. |
| Breaking point of emulsion | >95° C. |
| Electrical conductivity | Neg. |
| Percent oil phase produced at: | |
| 200 r.p.m. for 45 minutes | No separation. |
| 2000 r.p.m. for 45 minutes | <1% separation. |
| Viscosity | Excellent. |

EXAMPLE 6

| | Percent by volume |
|---|---|
| Peanut oil | 44.5 |
| Mannide monooleate | 5.0 |
| Aluminum monostearate | 0.5 |
| Phosphate buffered saline | 50.0 |

The above ingredients were admixed and converted into and emulsion by the method described in Example 1. The emulsion thus formed had the following stability characteristics:

| | |
|---|---|
| Stable droplets in water at room temperature | Yes. |
| Breaking point of emulsion | 92° C. |
| Electrical conductivity | Neg. |
| Percent oil phase produced at: | |
| 200 r.p.m. for 45 minutes | No separation. |
| 2000 r.p.m. for 45 minutes | <1% separation. |
| Viscosity | Excellent. |

EXAMPLE 7

| | Percent by volume |
|---|---|
| Peanut oil | 60.0 |
| Mannide monooleate | 5.0 |
| Aluminum monostearate | 5.0 |
| Phosphate buffered saline | 30.0 |

The above ingredients were admixed and converted into an emulsion by the method described in Example 1. The emulsion thus formed had the following stability characteristics:

| | |
|---|---|
| Stable droplets in water at room temperature | Yes. |
| Breaking point of emulsion | 93° C. |
| Electrical conductivity | Neg. |
| Percent oil phase produced at: | |
| 200 r.p.m. for 45 minutes | No separation. |
| 2000 r.p.m. for 45 minutes | No separation. |
| Viscosity | Excellent. |

EXAMPLE 8

| | Percent by volume |
|---|---|
| Peanut oil | 70.0 |
| Mannide monooleate | 5.0 |
| Aluminum monostearate | 3.0 |
| Phosphate buffered saline | 22.0 |

The above ingredients were admixed and converted into an emulsion by the method described in Example 1. The emulsion thus formed had the following stability characteristics:

| | |
|---|---|
| Stable droplets in water at room temperature | Yes. |
| Breaking point of emulsion | 92° C. |
| Electrical conductivity | Slight. |
| Percent oil phase produced at: | |
| 200 r.p.m. for 45 minutes | No separation. |
| 2000 r.p.m. for 45 minutes | 10% separation. |
| Viscosity | Fair. |

EXAMPLE 9

| | Percent by volume |
|---|---|
| Peanut oil | 43.0 |
| Mannide monooleate | 5.0 |
| Aluminum monostearate | 2.0 |
| Phosphate buffered saline containing influenza virus, polyvalent, types A and B containing a total of 500 CCA units per cc. (including 200 CCA units type A–2, Asian strain and 100 CCA units each of A/Ann Arbor, A/PR8 and B/Great Lakes per cc.) | 50.0 |

The above ingredients were admixed and converted into an emulsion by the method described in Example 1. The emulsion thus formed had the following stability characteristics:

| | |
|---|---|
| Stable droplets in water at room temperature | Yes. |
| Breaking point of emulsion | 96° C. |
| Electrical conductivity | Neg. |
| Percent oil phase produced at: | |
| 200 r.p.m. for 45 minutes | No separation. |
| 2000 r.p.m. for 45 minutes | 9.7% separation. |
| Stability at: | |
| 4° C. for 36 days | Excellent. |
| 25° C. for 36 days | Trace of creaming. |
| 37° C. for 36 days | Trace of creaming. |
| 56° C. for 36 days | 40% creaming with trace of aqueous separation. |

EXAMPLE 10

Emulsions were prepared as described in Example 9 but replacing the peanut oil by sesame oil, corn oil, olive oil, cottonseed oil, sweet almond oil, persic oil and chaulmoogra oil, each at a concentration of 43% by volume and in each instance a stable water in oil emulsion is obtained which complies with the standards set forth hereinabove for a stable water-in-oil emulsion.

The adjuvant compositions described in the above examples or modifications thereof can be employed as vehicles for the preparation of injectable antigen preparations. As any of the antigens described above either singly or in combination can be incorporated in the aqueous phase, only a few representative examples are given below of vaccines so prepared to illustrate their preparation and the adjuvant response obtained when administered to animals. Exhaustive examples are not included to describe every possible vaccine as to do so would only unduly lengthen the disclosure without materially adding to the knowledge concerning the use of the adjuvant preparations.

In the following examples and discussion, the abbreviation "CCA" refers to Chick Cell Agglutinin which is determined by the method described in J. Immunology 45:273 (1942), Hirst and Pickles.

EXAMPLE 11

| | Percent by volume |
|---|---|
| Peanut oil | 53.75 |
| Mannide monooleate | 1.25 |
| Aluminum monostearate | 5.0 |
| Influenza virus vaccine, polyvalent, types A and B containing a total of 500 CCA units per cc. (including 200 CCA units type A–2, Asian strain, 100 CCA units each of A/Ann Arbor, A/PR8 and B/Great Lakes per cc.) | 40.0 |

The above ingredients were admixed and formed into an emulsion by substantially the same method described in Example 1, and was found to comply with the standards set forth herein above for a stable water-in-oil emulsion.

EXAMPLE 12

| | Percent by volume |
|---|---|
| Peanut oil | 54.0 |
| Mannide monooleate | 5.0 |
| Aluminum monostearate | 1.0 |
| Influenza virus vaccine, polyvalent, types A and B containing a total of 500 CCA units per cc. (including 200 CCA units type A–2, Asian strain, 100 CCA units each of A/Ann Arbor, A/PR8 and B/Great Lakes per cc.) | 40.0 |

The above ingredients were admixed and formed into an emulsion by substantially the same method described in Example 1, and was found to comply with the standards set forth herein above for a stable water-in-oil emulsion.

EXAMPLE 13

| | Percent by volume |
|---|---|
| Peanut oil | 53.0 |
| Mannide monooleate | 5.0 |
| Aluminum monostearate | 2.0 |
| Influenza virus vaccine, polyvalent, types A and B containing a total of 500 CCA units per cc. (including 200 CCA units type A–2, Asian strain, 100 CCA units each of A/Ann Arbor, A/PR8 and B/Great Lakes per cc.) | 40.0 |

The above ingredients were admixed and formed into an emulsion by substantially the same method described in Example 1, and was found to comply with the standards set forth herein above for a stable water-in-oil emulsion.

EXAMPLE 14

| | Percent by volume |
|---|---|
| Peanut oil | 52.0 |
| Mannide monooleate | 5.0 |
| Aluminum monostearate | 3.0 |
| Influenza virus vaccine, polyvalent, types A and B containing a total of 500 CCA units per cc. (including 200 CCA units type A–2, Asian strain, 100 CCA units each of A/Ann Arbor, A/PR8 and B/Great Lakes per cc.) | 40.0 |

The above ingredients were admixed and formed into an emulsion by substantially the same method described in Example 1, and was found to comply with the standards set forth herein above for a stable water-in-oil emulsion.

EXAMPLE 15

| | Percent by volume |
|---|---|
| Peanut oil | 43.0 |
| Mannide monooleate | 5.0 |
| Aluminum monostearate | 2.0 |
| Phosphate buffered saline solution containing 660 CCA units per ml. polyvalent influenza virus vaccine (including 264 CCA units A/Asian, 132 CCA unit A/Ann Arbor, 132 CCA units A/PR8, 132 CCA Units B/Great Lakes per ml.) | 50.0 |

The above ingredients were admixed and formed into an emulsion by substantially the same method described in Example 1, and was found to comply with the standards set forth herein above for a stable water-in-oil emulsion.

EXAMPLE 16

| | Percent by volume |
|---|---|
| Peanut oil | 43.0 |
| Mannide monooleate | 5.0 |
| Aluminum monostearate | 2.0 |
| Purified poliomyelitis virus vaccine, trivalent, types I, II and III containing a total of 5–6 gamma [including 4.0 gamma of type I (Parker), and 0.8 gamma each of types II (MEFI) and III (Saukett)] per cc. | 50.0 |

The above ingredients were admixed and formed into an emulsion by substantially the same method described in Example 1, and was found to comply with the standards set forth herein above for a stable water-in-oil emulsion.

The adjuvant effect of the vaccines described in the foregoing examples was tested in animals by the following method.

Dual injections at zero time of 0.25 to 1.0 ml. were administered intramuscularly into each of 10 to 20 Hartley strain albino guinea pigs weighing between 450 and 550 grams each. In all experiments, several bleedings were taken at 4, 8 and 12 week intervals, and a measured aliquot of the individual sera for each bleeding was tested for antibody titer by the following technique:

For influenza antibody—Standard-pattern hemagglutination-inhibition(HI) test by the procedure described in J.A.M.A., 172, 1230–1238 (1960), Jensen, Woodhour and Bailey.

The results were compared to the antibody response of control guinea pigs simultaneously inoculated with 0.25 to 1.0 ml. of phosphate buffered saline containing the antigenic test dose.

The results observed are recorded in Tables I through III.

Table I
GUINEA PIG IMMUNE RESPONSE TO ADJUVANT VEHICLE CONTAINING INFLUENZA VIRUS VACCINE

[Dose: 1.0 ml. I.M. containing 200 CCA units at day "0"]

| Material Inoculated | Geometric mean serum HI titer at indicated week | | | | | | | | | | | | | | |
|---|---|---|---|---|---|---|---|---|---|---|---|---|---|---|---|
| | 4 | | | | | 8 | | | | | 12 | | | | |
| | A Jap 305 | A Ann Arbor | B Great Lakes 1739 | A PR8 | No. of Sera | A Jap 305 | A Ann Arbor | B Great Lakes 1739 | A PR8 | No. of Sera | A Jap 305 | A Ann Arbor | B Great Lakes 1739 | A PR8 | No. of Sera |
| Control Influenza vaccine (phosphate buffered saline) | 5 | 8 | 18 | 60 | 10 | 5 | 3 | 8 | 37 | 9 | 5 | 26 | 24 | 60 | 8 |
| Adjuvant preparation of Example 11 | 147 | 181 | 169 | 446 | 10 | 128 | 147 | 128 | 631 | 7 | 79 | 181 | 128 | 388 | 6 |

GUINEA PIG IMMUNE RESPONSE TO ADJUVANT VEHICLE CONTAINING INFLUENZA VIRUS VACCINE

Table II

[Dosage: 0.5 ml. I.M. containing 100 CCA units at day "0"]

| Material Inoculated | Geometric mean serum HI titer at indicated week | | | | | | | | | |
|---|---|---|---|---|---|---|---|---|---|---|
| | 4 | | | | | 8 | | | | |
| | A Jap 305 | A Ann Arbor | B Great Lakes 1739 | A PR8 | No. of Sera | A Jap 305 | A Ann Arbor | B Great Lakes 1739 | A PR8 | No. of Sera |
| Control Influenza vaccine (Phosphate buffered saline) | 3 | 4 | 9 | 28 | 19 | 2 | 7 | 12 | 69 | 15 |
| Adjuvant preparation of Example 12 | 45 | 69 | 39 | 294 | 18 | 37 | 45 | 23 | 416 | 17 |
| Adjuvant preparation of Example 13 | 52 | 73 | 56 | 338 | 19 | 26 | 39 | 26 | 274 | 16 |
| Adjuvant preparation of Example 14 | 79 | 119 | 79 | 338 | 17 | 45 | 49 | 34 | 338 | 15 |

Table III
GUINEA PIG IMMUNE RESPONSE TO ADJUVANT VEHICLE CONTAINING POLYVALENT INFLUENZA VIRUS VACCINE

[Dose: 0.25 ml. I.M. containing 62.5 CCA virus units at day "0"]

| Vaccine | Geometric mean HI antibody titer at 4 weeks | | | | |
|---|---|---|---|---|---|
| | A Jap 305 | A Ann Arbor | B Great Lakes 1739 | A PR8 | No. of Sera |
| Control influenza vaccine (phosphate buffered saline) | 3 | 6 | 9 | 56 | 18 |
| Adjuvant preparation of Example 9 | 97 | 158 | 97 | 548 | 23 |

While the invention has been illustrated by certain specific examples which describe the preparation of representative adjuvant vehicles and representative compositions comprising an antigen incorporated in the aqueous phase of the adjuvant vehicle, it is to be understood that modifications and variations can be made in selecting the ingredients to be combined in the preparation of these compositions within the framework of the disclosure and of the appended claims.

What is claimed is:

1. A parenteral vaccine preparation in the form of a water-in-oil emulsion comprising
   (A) an emulsion vehicle which contains on a volume basis
      aluminum monostearate—0.5–5%
      vegetable oil—20–75%
      mannide monooleate—2.5–25%, and
   (B) sufficient aqueous phase to bring the volume up to 100% said aqueous phase having incorporated therein, prior to emulsification, an immunological agent in an amount sufficient to elicit antibody response when parenterally administered to a host.

2. A water-in-oil emulsion as claimed in claim 1, wherein the vegetable oil is selected from the group consisting of sesame oil, peanut oil, chaulmoogra oil, corn oil, olive oil, cottonseed oil, oil of sweet almond, and persic oil.

3. A water-in-oil emulsion as claimed in claim 1 wherein the vegetable oil is sesame oil.

4. A water-in-oil emulsion as claimed in claim 1 wherein the vegetable oil is peanut oil.

5. A water-in-oil emulsion as claimed in claim 4 wherein influenza antigen is incorporated in the aqueous phase prior to emulsification and in an amount sufficient to elicit antibody response when parenterally administered to a host.

6. A water-in-oil emulsion as claimed in claim 4 wherein poliomyelitis antigen is incorporated in the aqueous phase prior to emulsification and in an amount sufficient to elicit antibody response when parenterally administered to a host.

7. A parenteral vaccine preparation in the form of a water-in-oil emulsion comprising on a weight basis about 43% of peanut oil, about 5% mannide monooleate, about 2% aluminum monostearate, and about 50% aqueous phase containing an immunological agent in an amount sufficient to elicit antibody response when parenterally administered to a host.

8. Process for producing a parenteral vaccine preparation in the form of a water-in-oil emulsion characterized in that aluminum monostearate is dispersed in a preformed mixture of vegetable oil and mannide monooleate with agitation and simultaneous heating, the resulting dispersion is cooled and an aqueous phase containing an antibody eliciting amount of an immunological agent is then added with stirring to form the emulsion.

9. A process for elevating antibody titers in a host comprising parenterally administering to said host a unit dosage quantity of a water-in-oil emulsion comprising on a volume basis about 20 to about 75% of a vegetable oil, about 2.5 to about 25% of mannide monooleate, about 0.5 to about 5% of aluminum monostearate, and sufficient aqueous phase to bring the volume to 100%, said aqueous phase having incorporated therein an antibody-eliciting amount of an immunological agent.

10. A process as claimed in claim 9 wherein the vegetable oil is peanut oil.

11. A process as claimed in claim 9 wherein the vegetable oil is peanut oil and the immunological agent is influenza antigen.

12. A process as claimed in claim 9 wherein the vegetable oil is peanut oil and the immunological agent is poliomyelitis antigen.

References Cited in the file of this patent

UNITED STATES PATENTS

| | | |
|---|---|---|
| 1,791,878 | Strauch | Feb. 10, 1931 |
| 2,055,083 | Klein et al. | Sept. 22, 1936 |
| 2,154,432 | Boericke et al. | Apr. 18, 1939 |
| 2,529,461 | Schneiderwirth | Nov. 7, 1950 |
| 2,675,343 | Clymer et al. | Apr. 13, 1954 |
| 2,819,199 | Kalish | Jan. 7, 1958 |
| 2,972,565 | Zilversmit | Feb. 21, 1961 |
| 2,981,658 | Youngner et al. | Apr. 25, 1961 |
| 2,988,484 | Barsky et al. | June 13, 1961 |
| 3,083,142 | Howell et al. | Mar. 26, 1963 |
| 3,096,249 | Prigal | July 2, 1963 |
| 3,099,601 | Davis et al. | July 30, 1963 |

FOREIGN PATENTS

| | | |
|---|---|---|
| 759,577 | Great Britain | Oct. 17, 1956 |
| 888,180 | Great Britain | Jan. 24, 1962 |

OTHER REFERENCES

Freund: "Some Aspects of Active Immunization," Annual Review of Microbiology, vol. I, pp. 291–308 (1947), published by Annual Reviews, Inc., Stanford, California.

Jensen et al.: "Immunization With Polyvalent Influenza Vaccines," J.A.M.A., vol. 172, pp. 1230–1238, Mar. 19, 1960.

Berlin: "Gross Physical Properties of Emulsified Influenza Virus Vaccines and the Adjuvant Response," J. Immun., vol. 85, pp. 81–89, July 1960.

Metcalf et al.: "Studies of the Dispersion of Emulsified Extracts by Means of Incorporated Radioisotopes," Ann. Allergy, vol. 18, pp. 983–989, September 1960.

Woodhour et al.: "Development and Application of New Parenteral Adjuvants," J. Immun., vol. 86, pp. 681–689, June 1961.

Eisen-Stadt et al.: "Current Status of Emulsion Therapy in the Treatment of Allergy," J. Lancet, vol. 81, pp. 276–278, July 1961.

Brown: "The Treatment of Allergy to Inhalants by Single Annual Injections of Emulsified Extracts," Clin. Med. (Winnetka), vol. 8, pp. 1477–1489, August 1961.

Dale: "The Effect of the Components of Adjuvant Emulsions on Lymphatics in the Mouse's Ear," Brit. J. Exp. Path., vol. 42, pp. 297–302, August 1961.

Brown et al.: "Visualization of the Fate of Injections of Water-in-Oil Emulsions by Means of Radiopaque Media," II. Ann. Allergy, vol. 19, pp. 1016–1018, September 1961.

Molomut et al.: "Animal Toxicity Evaluation of Drakeol-Arlacel Mixtures Used for Allergenic Extract Emulsions," Ann. Allergy, vol. 19, pp. 1010–1015, September 1961.

Prigal: "Improved Emulsions of Allergens With Built-in Safety Features," New York J. Med., vol. 61, pp. 3616–3623, Nov. 1, 1961.